No. 891,021. PATENTED JUNE 16, 1908.
F. L. O. WADSWORTH.
GLASS BOX OR CASE.
APPLICATION FILED JUNE 17, 1905. RENEWED AUG. 15, 1907.

WITNESSES
Warren W. Swartz
R. A. Balderson

INVENTOR
F. L. O. Wadsworth
by Bakewell & Byrnes
his Attorneys

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF NEW YORK, N. Y., A CORPORATION OF WEST VIRGINIA.

GLASS BOX OR CASE.

No. 891,021.

Specification of Letters Patent.

Patented June 16, 1908.

Application filed June 17, 1905, Serial No. 265,309. Renewed August 15, 1907. Serial No. 388,676.

*To all whom it may concern:*

Be it known that I, FRANK L. O. WADSWORTH, of Morgantown, Monongalia county, West Virginia, have invented a new and useful Glass Box or Case, of which the following is a full, clear, and exact description, reference being had to the accompanying drawings, forming part of this specification, in which—

Figure 1:
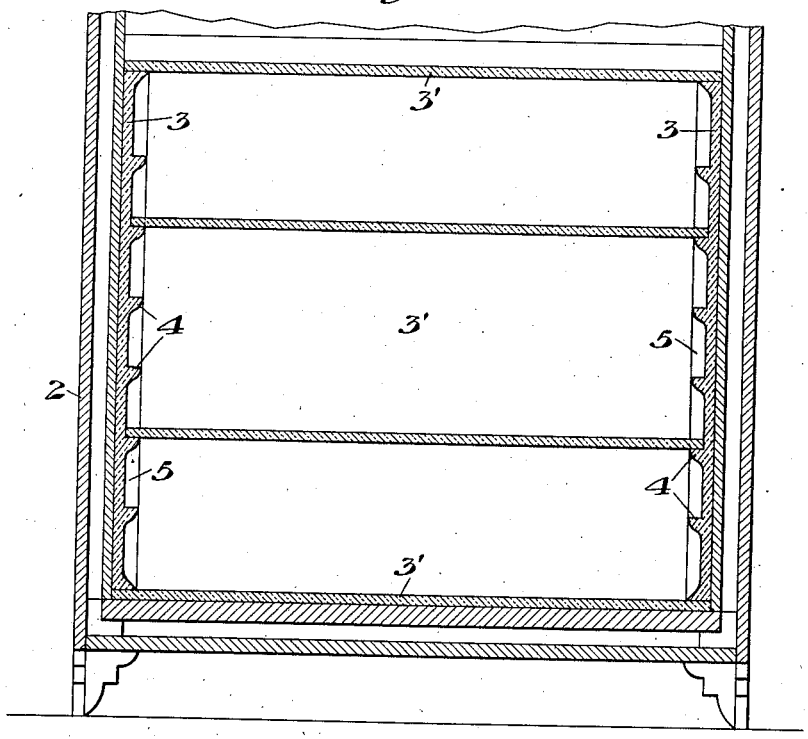
Figure 2:
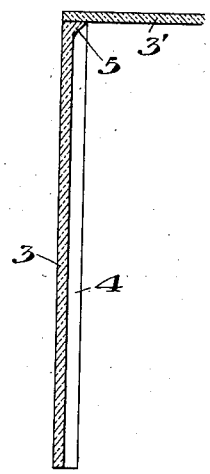
Figure 3:
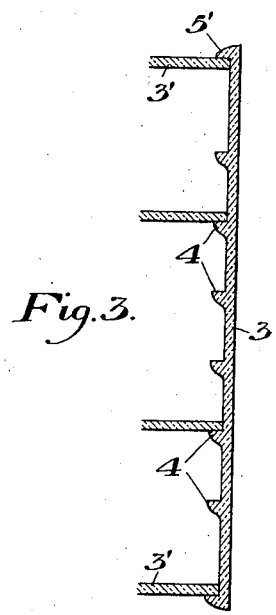

Figure 1 is a sectional elevation of a refrigerator, partly broken away; Fig. 2 is a sectional detail view of the glass lining; and Fig. 3 is a modified construction.

In the manufacture of boxes or cases of glass, such as glass-lined refrigerators, it has been necessary to provide gaps between the edges of the adjacent glass plates for the purpose of attaching the shelf-brackets to the framework. This is objectionable because among other things it breaks the continuity of the glass lining, and detracts from the sanitary value of the device. This difficulty is obviated by my invention which enables me to form a refrigerator with a lining of glass slabs or plates which can be set closely together without any intermediate gap and will still support the shelves, and furthermore to provide a glass-lining having close corner-joints without substantial crevices. It enables me also to provide as many shelf-supports as can be utilized, so that the shelves can be shifted and placed in any position desired. Refrigerators made in accordance with my invention are therefore very convenient and are entirely sanitary and cleanly, the whole interior being well covered with glass, and the several plates being insulated from one another as thoroughly as can be done.

My invention may be applied not only to refrigerators, but to other glass boxes or cases, such for example as glass boxes for storage batteries, in which the partitions for holding and spacing the grids may be formed in accordance with my invention.

In the drawings I show the invention applied to the construction of a glass-lined refrigerator, and will describe the invention with reference thereto.

In the drawings, 2 represents the frame of a refrigerator having a glass lining constituted by glass plates or slabs 3 having integral parallel shelf or partition-supports 4, 4 which may be as many in number as required. Some of the plates have projecting margins 5 preferably curved on the inner surface, so that when they are fitted together with plain plates the corners will be curved or filleted and will make a tight joint in which dirt will not lodge, and which can be reached readily by ordinary cleaning implements or cloths. The plates which are provided with these projecting margins are preferably the same plates on which the supports 4, 4 are formed, and they are interfitted with plain plates 3' as shown. The shelf-supports 4 preferably extend to and are made integral with at least one of the marginal projections, since in this way the strongest possible construction is secured.

In Fig. 3 I show a modified construction in which the marginal projections 5' fit over the plain plates 3' instead of fitting under them as shown in Fig. 2. Glass cases for holding the liquid and battery elements of storage batteries may be made in like manner, the projections in that case being vertical and being adapted to constitute means for holding and spacing the grids apart from each other. The projections on the glass plate or slab are preferably formed by rolling a mass of glass into a sheet, and then bringing upon the same a die which by forcible pressure molds the projections thereon.

The form of the projections may be modified, since

What I claim is:—

A glass box or case having plates, some of them being formed with interior marginal projecting portions adapted to make a tight joint and with integral projections for partitions or shelves connecting with at least one of the marginal projections.

In testimony whereof, I have hereunto set my hand.

FRANK L. O. WADSWORTH.

Witnesses:
THOMAS W. BAKEWELL,
H. M. CORWIN.